United States Patent
Melius

(10) Patent No.: US 8,070,439 B2
(45) Date of Patent: Dec. 6, 2011

(54) SYSTEMS AND METHODS FOR TESTING A WIND TURBINE PITCH CONTROL SYSTEM

(75) Inventor: Jeffrey Alan Melius, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 12/608,393

(22) Filed: Oct. 29, 2009

(65) Prior Publication Data

US 2010/0135801 A1  Jun. 3, 2010

(51) Int. Cl.
*F03D 7/04* (2006.01)

(52) U.S. Cl. ......................................................... 416/61

(58) Field of Classification Search ............... 416/38, 416/43, 44, 47, 48, 61
See application file for complete search history.

(56) References Cited

U.S. PATENT DOCUMENTS

| | | | |
|---|---|---|---|
| 7,121,795 B2 * | 10/2006 | Moroz et al. ........................ | 416/1 |
| 7,160,083 B2 | 1/2007 | Pierce et al. | |
| 2006/0140761 A1 | 6/2006 | LeMieux | |
| 2007/0183885 A1 * | 8/2007 | Ormel et al. ..................... | 415/4.1 |
| 2009/0047130 A1 | 2/2009 | Egedal | |
| 2009/0184519 A1 * | 7/2009 | Nies et al. ........................ | 290/44 |
| 2010/0004878 A1 * | 1/2010 | Volanthen et al. ............... | 702/42 |
| 2010/0209243 A1 * | 8/2010 | Birkemose et al. ............... | 416/1 |

FOREIGN PATENT DOCUMENTS

WO  WO 99/57435  * 11/1999

* cited by examiner

*Primary Examiner* — Nathaniel Wiehe

(74) *Attorney, Agent, or Firm* — Sutherland Asbill & Brennan LLP

(57) ABSTRACT

Certain embodiments of the invention may include systems and methods for testing a wind turbine pitch control system. According to an exemplary embodiment of the invention, a method for testing a wind turbine pitch control system is provided. The method can include measuring tangential acceleration (At) of a wind turbine rotor, determining pitch angle of one or more turbine blades, and predicting torque applied to the one or more turbine blades based at least in part on the tangential acceleration (At) and the pitch angle.

20 Claims, 3 Drawing Sheets

SYSTEMS AND METHODS FOR TESTING A WIND TURBINE PITCH CONTROL SYSTEM

FIELD OF THE INVENTION

This invention generally relates to systems and methods for testing a wind turbine component, and particularly, systems and methods for testing a wind turbine pitch control system.

BACKGROUND OF THE INVENTION

It is known that electrical power can be harvested from wind energy using wind turbines. Control of the turbine blade pitch is often utilized for creating optimum turbine loading conditions in order to harvest the wind energy with the highest possible efficiently, but control of the turbine blade pitch may also be required in emergencies to bring the turbine rotor to a safe condition of nearly zero rotational speed. It may be necessary to modify the blade pitch in certain circumstances when no grid power is available. For example, the blades may not be pitched at an optimum or safe angle during a power grid outage. Therefore, a battery system may be utilized to provide emergency backup power to the turbine blade pitch control system and the blade pitch motors.

An emergency backup pitch control system may include components such as batteries, controllers, blade pitch modules, blade pitch motors, accelerometers, blade pitch encoders, gears, shafts, and lubrication systems. These components can be tested periodically to determine whether the emergency backup pitch control system is able to perform its intended function during a power outage. However, testing conditions for the backup pitch control system are highly dependent upon the orientation of the rotor blades. Therefore, a need remains for improved systems and methods for testing wind turbine pitch control systems.

BRIEF SUMMARY OF THE INVENTION

Some or all of the above needs may be addressed by certain embodiments of the invention. Certain embodiments of the invention may include systems and methods for wind turbine pitch control system testing.

According to an exemplary embodiment of the invention, a method is provided for testing a wind turbine pitch control system. The method may include measuring tangential acceleration (At) of a wind turbine rotor, determining a pitch angle of one or more turbine blades, and predicting torque applied to the one or more turbine blades based at least in part on the tangential acceleration (At) and the pitch angle.

According to another exemplary embodiment of the invention, a system is provided for testing a wind turbine pitch control system. The system includes at least one accelerometer operable to measure tangential acceleration (At) of a wind turbine rotor at one or more measurement positions associated with a wind turbine rotor, at least one blade pitch encoder operable to measure pitch of one or more turbine blades, and at least one controller operable to control pitch of one or more turbine blades. The system also includes one or more processors operable to determine pitch angle of one or more turbine blades based at least in part on the at least one blade pitch encoder and predict torque applied to the one or more turbine blades based at least in part on the tangential acceleration (At) and the pitch angle.

According to another exemplary embodiment, a wind turbine is provided. The wind turbine includes a rotor, one or more blades, at least one accelerometer mounted to the rotor, wherein the at least one accelerometer is operable to measure tangential acceleration (At) at one or more measurement positions associated with a wind turbine rotor, one or more batteries, and one or more blade pitch motors. The wind turbine also includes a controller including a blade pitch module operable to control pitch of one or more turbine blades. The controller also includes one or more processors operable to receive measurements from the at least one accelerometer, determine pitch angle of one or more turbine blades based at least in part on the at least one blade pitch encoder, and predict torque applied to the one or more turbine blades based at least in part on the tangential acceleration (At) and the pitch angle.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
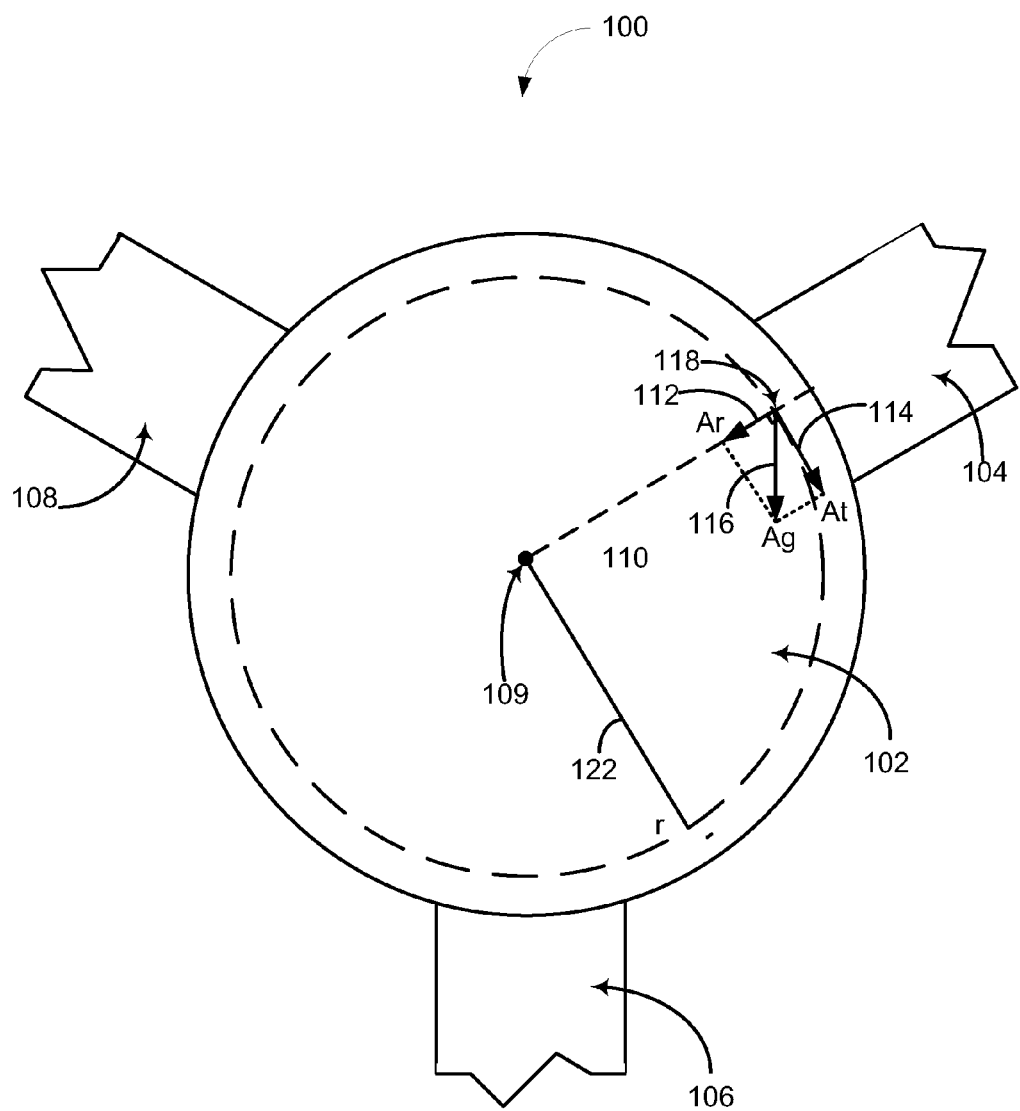
FIG. 1 is a diagram of an illustrative wind turbine rotor according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout in this specification is defined to mean "example."

According to exemplary embodiments of the invention, a method and system for testing the components associated with a wind turbine blade pitch system are provided. Certain embodiments of the invention may enable the components associated with the blade pitch system to be tested and evaluated more accurately by including blade pitch torsional loading (or torque) information in the testing and evaluation of the components.

According to exemplary embodiments of the invention, the turbine blade center of mass may not necessarily be collinear with the blade pitch axis of rotation; and therefore, the torsional loading on each blade may be a function of the blade angular position with respect to the rotor axis. For example, gravity may induce a significant amount of torque on a blade at about the 90-degree (3-o'clock) or about 270-degree (9-o'clock) position, but the torque may be minimal when the blade is at about 0-degrees (12-o'clock) or about 180-degrees (6-o'clock) position. According to exemplary embodiments of the invention, an accelerometer attached to the rotor may be utilized to measure the magnitude and sign of the gravity component that is tangential to the rotor, and this accelerometer measurement may be utilized to predict the torque of the blade.

According to exemplary embodiments of the invention, an accelerometer may be positioned near the blade root to measure the force due to gravity tangential to hub rotation. Due to the design of electronic accelerometers, gravitational forces may be reported as an acceleration equal to the force of a gravity vector component along the measurement axis in a direction opposite to the force applied by gravity. A stationary accelerometer with a vertical axis of measurement may report about 1 g of acceleration in the upward direction. When a blade is straight up or straight down (about 0 or about 180 degrees) the accelerometer in the tangential axis will report about 0 g's of acceleration. When the rotor is positioned at about 90 or about 270 degrees, the accelerometer may report about +1 g or about −1 g.

According to exemplary embodiments of the invention, sensors may be utilized for determining pitch angle, and accelerometers may be used for measuring the tangential gravity vector. According to an exemplary embodiment of the invention, the blade pitch angle and the tangential gravity vector may be utilized to predict the amount of effort that may be suitable to modify the blade pitch. According to another exemplary embodiment of the invention, the blade pitch angle and the tangential gravity vector may be utilized to predict the blade pitch rate, which may vary as a function of the blade pitch and hub angle. According to exemplary embodiments of the invention the prediction of the blade pitch rate and/or the effort suitable to modify the blade pitch may be calculated directly using the accelerometer measurements and pitch angle information. The blade pitch angle and the tangential gravity vector information may allow pass/fail pitch rate limits during the testing of a blade pitch control system to be adjusted as a function of gravity vector and blade pitch angle. The calculation of pitch rate error limits may be performed using a table lookup or an equation. According to an exemplary embodiment of the invention, the torque and pitch rate error limit may be calculated according to the following equations:

$Tf$=pitch bearing frictional torque=$f(\text{abs}(At))$, where $At$=tangential acceleration.

$Tgm=f(At, Pa)$, where $Pa$=Pitch angle.

$Tp$=Predicted torque=$Tc+Tf+Tgm$, where $Tc$=Constant torque (independent of gravity).

$Sp$=Predicted pitch rate=$f(Tp)$.

$SL$=Pitch rate error limit=$Sp$*% margin.

According to certain exemplary embodiments of the invention, the blade pitch angle and the tangential gravity vector may be utilized to predict the blade pitch rate in the testing of an emergency feather system. Feathering is the process of changing the blade pitch angle from the power position near zero degrees to the feather position near 90 degrees. This feathering process may slow the turbine rotor to a safe condition of nearly zero rotational speed. The feathering system may be designed to feather the blades if the normal pitch system operation is incapable of feathering, for example, during grid loss, emergency stop and/or over speed detection. Since the emergency feathering system must be operational during a grid outage, it may be powered by batteries.

According to certain exemplary embodiments of the invention, the blade pitch rate can be a function of battery health and pitch motor load. Since the blade center of mass may not necessarily be collinear with the pitch axis of rotation, gravity and pitch angle can have a relatively large effect on the pitch motor load and resulting pitch rate. According to an exemplary embodiment of the invention, an emergency feathering system battery test may be conducted with the rotor nearly stopped and without regard to rotor position. In this embodiment, the blade may be at any angle relative to the turbine, such as up, down, left or right of the turbine, as the test is conducted. According to exemplary embodiments of the invention, pitch rate limits may be set for expected pitch rate conditions based at least upon the blade pitch and the predicted torque on the blade due to gravity.

To ensure the health of the emergency backup system and associated components (including controllers, blade pitch modules, batteries, blade pitch motors, accelerometers, blade pitch encoders, gears, shafts, or lubrication systems) the components may be periodically tested by the turbine control system using some or all of the following steps:

a. The rotor may be brought to nearly zero speed by feathering all blades to about 90 degrees.
b. A single blade may then be driven to the full power position of near zero degrees of pitch angle.
c. The emergency system may be activated to return the blade to about 90 degrees.
d. The pitch rate may be measured at various points as the blade travels to about 90 degrees.
e. The pitch rates may be compared to limits.
f. Emergency system faults may be issued if the rates are below the limits.
g. The process may be repeated from step b for each of the remaining blades.

Various system components for testing the wind turbine pitch control system, according to embodiments of the invention, will now be described with reference to the accompanying figures.

FIG. 1 is a diagram of an illustrative wind turbine rotor according to an exemplary embodiment of the invention. According to exemplary embodiments of the invention, FIG. 1 illustrates a wind turbine (100) comprising a rotor (102), and blades (104, 106, 108). One or more blades may be utilized in other exemplary embodiments. According to exemplary embodiments, the rotor (102) may rotate about an axis of rotation (109). According to exemplary embodiments, an accelerometer (118) positioned at about a radius (122) (r) from the axis of rotation (109) may measure one or more components of a gravity vector (116) (Ag), which may be comprised of a radial acceleration (112) (Ar) component and a tangential acceleration (114) (At) component.

Figure 2:
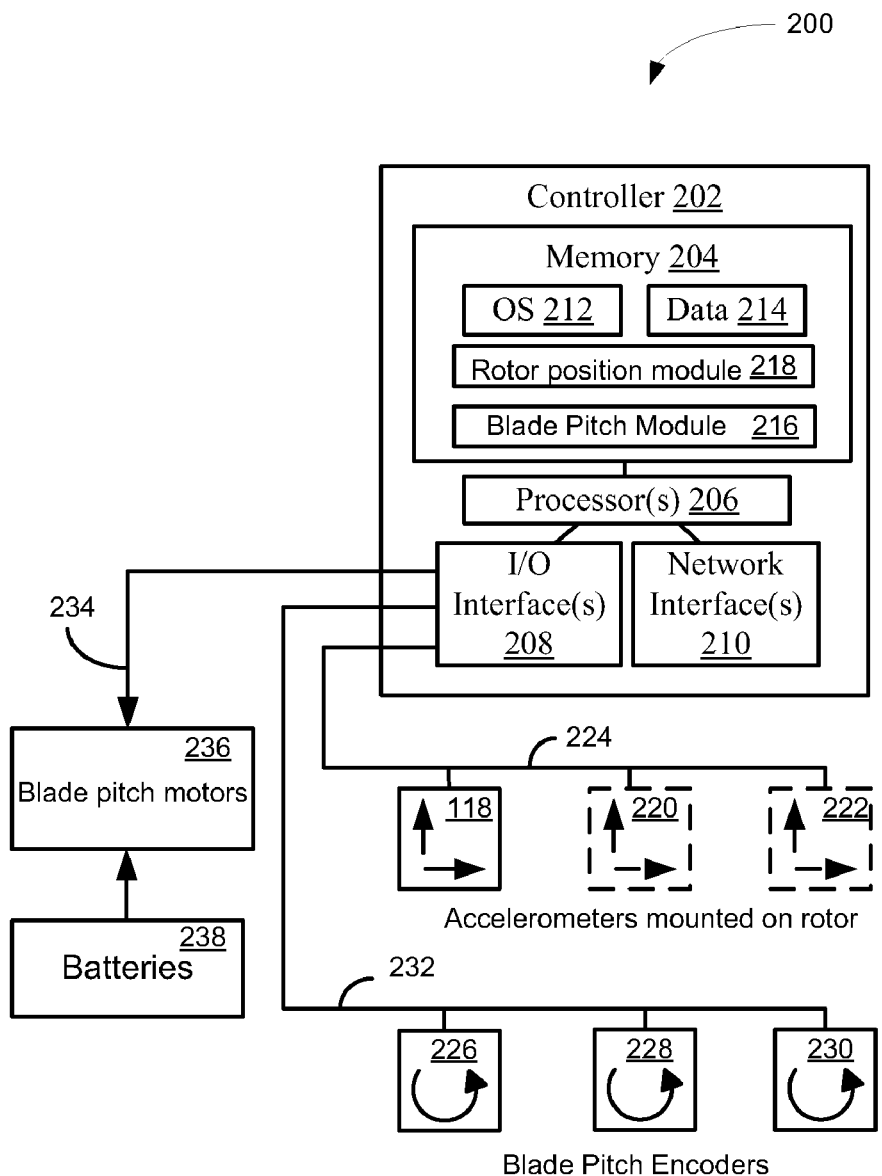
FIG. 2 is a diagram of an illustrative wind turbine control system according to an exemplary embodiment of the invention.

FIG. 2 illustrates a wind turbine control system (200). According to exemplary embodiments of the invention, the wind turbine control system (200) may include a controller 202. The controller (202) may include a memory (204), one or more computer processors (206), one or more I/O (input-output) interfaces (208), and one or more network interfaces (210). The processor(s) (206) may be in communication with the memory (204), the I/O interface(s) (208), and the network interface(s) (210). The memory may be operable to store an operating system (212), data (214), a blade pitch module (216), and a rotor position module (218).

According to an exemplary embodiment of the invention, the wind turbine control system (200) may also include an accelerometer (118). According to other exemplary embodiments, additional optional accelerometers (220, 222) may be included and utilized to increase the accuracy of the measurements, and/or to provide redundancy. Accelerometer (118) and optional accelerometers (220, 222) may produce accelerometer signals (224) for input to the processors (206) via the one or more I/O interfaces (208).

According to an exemplary embodiment of the invention, the wind turbine control system 200 may also include one or more blade pitch encoders or sensors (226, 228, 230). The blade pitch encoders (226, 228, 230) may measure the pitch angle of the blades (104, 106, 108). The blade pitch encoders (226, 228, 230) may be incremental encoders and may provide encoder signals (232) for input to the processors (206) via the one or more I/O interfaces (208).

According to an exemplary embodiment of the invention, the blade pitch module (216) may be in communication with the processor (206) to produce blade pitch control signals (234) for controlling the blade pitch motors (238) based at least in part on the blade pitch encoder signals (232).

According to an exemplary embodiment of the invention, the accelerometer signals (224) and the encoder signals (232) may be processed to determine a pitch torque applied to one or more of the blades (104, 106, 108) due to gravity. This information may also be utilized by processors (206) or other remote processors to set or adjust testing limits.

According to an exemplary embodiment of the invention, one or more batteries (238) may supply power to the blade pitch motors (236). The batteries (238) may also supply power to any of the other components of the wind turbine pitch control system (200).

Figure 3:
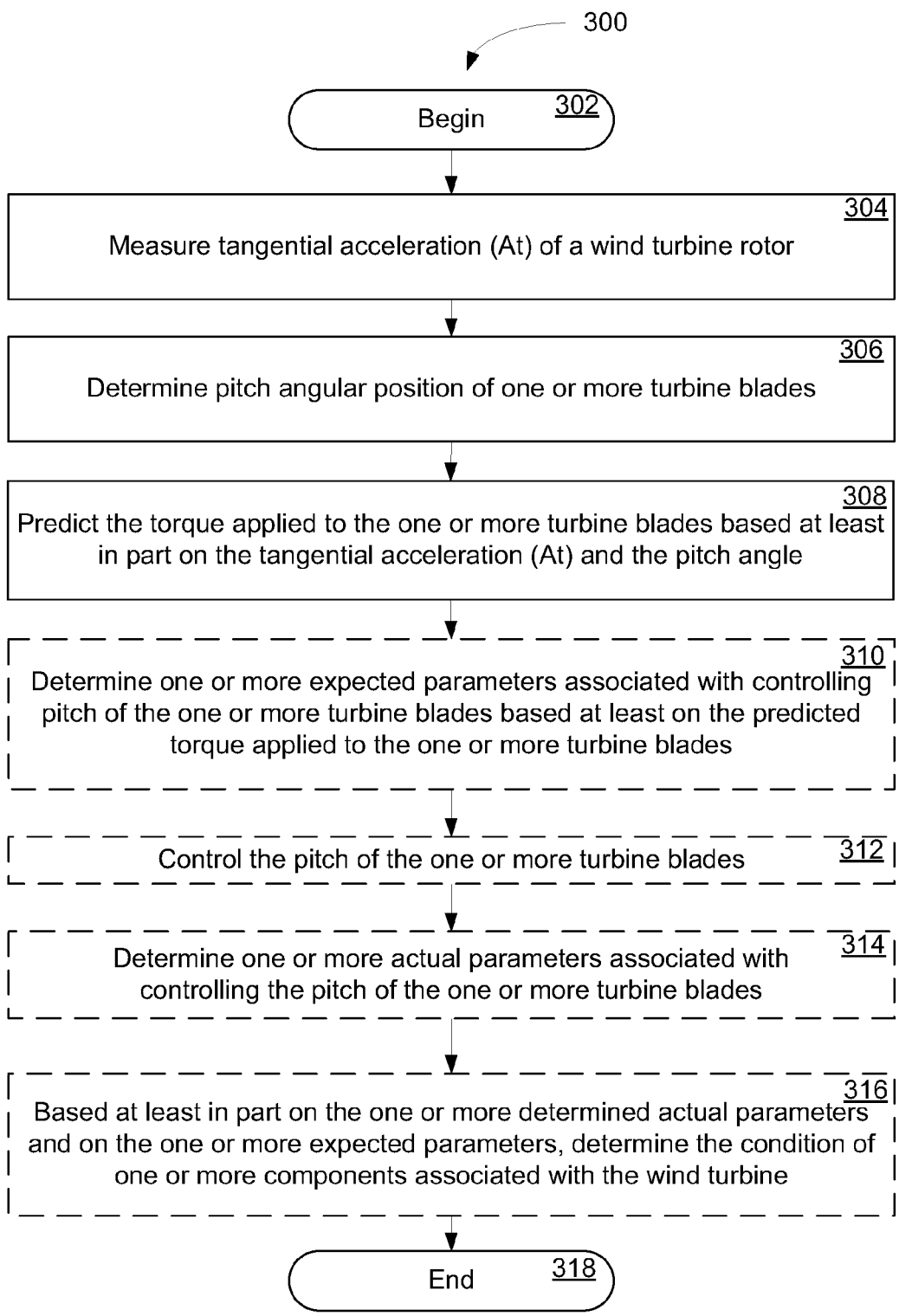
FIG. 3 is a flowchart for an exemplary method according to an exemplary embodiment of the invention.

An exemplary method 300 for testing a wind turbine pitch control system and associated components will now be described with reference to the flowchart of FIG. 3. The method starts in block 302. In block 304 and according to an exemplary embodiment of the invention, the tangential acceleration (At) of the wind turbine rotor is measured. According to exemplary embodiments, the tangential acceleration due to gravity may be measured using one or more accelerometers (118, 220, 222). In block 306, and according to an exemplary embodiment, the pitch angle of one or more turbine blades (104, 106, 108) may be determined. According to exemplary embodiments, the blade pitch angle may be determined via one or more blade pitch encoders (226, 228, 230).

The method 300 may continue with optional blocks 310, 312, 314 and 316. In optional block 310, and according to an exemplary embodiment, the torque applied to the one or more turbine blades (104, 106, 108) may be predicted based at least in part on the tangential acceleration (114) (At) and the blade pitch angle. According to exemplary embodiments of the invention, other expected parameters including current, blade pitch rotation time, or blade pitch rotation position as a function of time, may be predicted based at least in part on the tangential acceleration (114) (At) and the blade pitch angle.

In optional block 312, and according to an exemplary embodiment, the pitch of the one or more turbine blades may be controlled. In optional block 314, one or more actual parameters associated with controlling the pitch of the one or more turbine blades may be determined. According to exemplary embodiments, actual parameters associated with controlling the pitch may include blade pitch motor torque, blade position, battery current, blade pitch motor current, blade pitch rotation angle, blade pitch rotation time, or blade pitch rotation position as a function of time.

In optional block 316, and according to an exemplary embodiment, the condition of one or more components associated with the wind turbine may be determined based at least in part on the one or more determined actual parameters and on the one or more expected parameters. According to exemplary embodiments, the one or more components associated with the wind turbine may include a controller, a blade pitch module, a battery, a blade pitch motor, an accelerometer, a blade pitch encoder, a gear, a shaft, or a lubrication system The method 300 ends in block 318.

Accordingly, exemplary embodiments of the invention can provide the technical effects of creating certain systems and methods that can test a wind turbine pitch control system. Exemplary embodiments of the invention can provide the further technical effects of providing systems and methods for testing components associated with a wind turbine pitch control system.

In certain embodiments of the invention, the wind turbine 100 and the wind turbine control system 200 may include any number of software applications that are executed to facilitate any of the operations.

In certain embodiments, one or more I/O interfaces may facilitate communication between the wind turbine control system 200 and one or more sensors or input/output devices. For example, accelerometers, signal conditioners, a universal serial bus port, a serial port, a disk drive, a CD-ROM drive, and/or one or more user interface devices, such as, a display, keyboard, keypad, mouse, control panel, touch screen display, microphone, etc. that facilitate user interaction with the wind turbine control system 200. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the wind turbine control system 200 inputs and outputs to one or more suitable networks and/or connections, for example, the connections that facilitate communications with any number of sensors associated with the system. The one or more network interfaces may further facilitate connection to one or more suitable networks, for example, a local area network, a wide area network, the Internet, a cellular network, a radio frequency network, a Bluetooth™ enabled network, a Wi-Fi™ enabled network, a satellite-based network, any wired network, any wireless network, etc for communication with external devices and/or systems.

As desired, embodiments of the invention may include the wind turbine 100 system and the wind turbine control system 200 with more or less than the components illustrated in FIGS. 1 and 2.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method comprising executing computer executable instructions by one or more processors for testing a wind turbine pitch control system, the method further comprising:
   measuring tangential acceleration (At) of a wind turbine rotor;
   determining pitch angle of one or more turbine blades;
   predicting torque applied to the one or more turbine blades based at least in part on the tangential acceleration (At) and the pitch angle; and
   predicting a blade pitch rate for testing an emergency feather system based on the measured tangential acceleration and the determined pitch angle or on the predicted torque.

2. The method of claim 1, further comprising:
   determining one or more expected parameters associated with controlling pitch of the one or more turbine blades based at least on the predicted torque applied to the one or more turbine blades;
   controlling pitch of the one or more turbine blades;
   determining one or more actual parameters associated with controlling the pitch of the one or more turbine blades; and,
   determining a condition of one or more components associated with the wind turbine based at least in part on the one or more actual parameters and on the one or more expected parameters.

3. The method of claim 2, wherein one or more condition thresholds are adjusted based at least in part on the predicted torque applied to the one or more turbine blades.

4. The method of claim 2, wherein the expected parameters comprise at least one of the following: torque, current, blade pitch rotation time, or blade pitch rotation position as a function of time.

5. The method of claim 2, wherein the actual parameters comprise at least one of the following: blade pitch motor torque, blade position, battery current, blade pitch motor current, blade pitch rotation angle, blade pitch rotation time, or blade pitch rotation position as a function of time.

6. The method of claim 2, wherein the components comprise at least one of the following: controller, blade pitch module, batteries, blade pitch motor, accelerometer, blade pitch encoder, gear, shaft, or lubrication system.

7. The method of claim 1, further comprising controlling an angular position of the rotor to control testing conditions.

8. The method of claim 1, wherein measuring tangential acceleration (At) comprises measuring each of the one or more turbine blades with an accelerometer.

9. A system for testing a wind turbine pitch control system, the system comprising:
   at least one accelerometer operable to measure tangential acceleration (At) of a wind turbine rotor at one or more measurement positions associated with a wind turbine rotor;
   at least one blade pitch encoder operable to measure pitch of one or more turbine blades;
   at least one controller operable to control pitch of one or more turbine blades; and
   one or more processors operable to:
      determine pitch angle of one or more turbine blades based at least in part on the at least one blade pitch encoder;
      predict torque applied to the one or more turbine blades based at least in part on the tangential acceleration (At) and the pitch angle; and
      predict blade pitch rate for testing an emergency feather system based on the measured tangential acceleration and the determined pitch angle or on the predicted torque.

10. The system of claim 9, wherein the one or more processors are further operable to:
   determine one or more expected parameters associated with controlling pitch of the one or more turbine blades based at least on the predicted torque applied to the one or more turbine blades;
   control pitch of the one or more turbine blades;
   determine one or more actual parameters associated with controlling the pitch of the one or more turbine blades; and,
   determine a condition of one or more components associated with the wind turbine based at least in part on the one or more actual parameters and on the one or more expected parameters.

11. The system of claim 10, wherein the one or more condition thresholds are adjusted based at least in part on the predicted torque applied to the one or more turbine blades.

12. The system of claim 10, wherein the one or more processors are further operable to determine expected parameters comprising at least one of: torque, current, blade pitch rotation time, or blade pitch rotation position as a function of time.

13. The system of claim 10, wherein the one or more processors are further operable to determine actual parameters comprising at least one of: blade pitch motor torque, blade position, battery current, blade pitch motor current, blade pitch rotation angle, blade pitch rotation time, or blade pitch rotation position as a function of time.

14. The system of claim 10, wherein the one or more processors are further operable to determine the condition of components comprising at least one of: controller, blade pitch module, batteries, blade pitch motor, accelerometer, blade pitch encoder, gear, shaft, or lubrication system.

15. The system of claim 9, wherein the one or more processors are further operable to control an angular position of the rotor.

16. A wind turbine comprising:
   a rotor;
   one or more blades;
   at least one accelerometer mounted to the rotor, wherein the at least one accelerometer is operable to measure tangential acceleration (At) at one or more measurement positions associated with a wind turbine rotor;
   one or more batteries;
   one or more blade pitch motors; and,
   a controller comprising:
      a blade pitch module operable to control pitch of one or more turbine blades; and
      one or more processors operable to:
         receive measurements from the at least one accelerometer;
         determine pitch angle of one or more turbine blades based at least in part on the at least one blade pitch encoder;
         predict torque applied to the one or more turbine blades based at least in part on the tangential acceleration (At) and the pitch angle; and
         predict blade pitch rate for testing an emergency feather system based on the measured tangential acceleration and the determined pitch angle or on the predicted torque.

17. The wind turbine of claim 16, wherein the one or more processors are further operable to:
   determine one or more expected parameters associated with controlling pitch of the one or more turbine blades based at least on the predicted torque applied to the one or more turbine blades;
   control pitch of the one or more turbine blades;
   determine one or more actual parameters associated with controlling the pitch of the one or more turbine blades; and,
   determine a condition of one or more components associated with the wind turbine based at least in part on the one or more actual parameters and on the one or more expected parameters.

18. The wind turbine of claim 17, wherein the one or more processors are further operable to determine expected parameters comprising at least one of: torque, current, blade pitch rotation time, or blade pitch rotation position as a function of time.

19. The wind turbine of claim 17, wherein the one or more processors are further operable to determine actual parameters comprising at least one of: blade pitch motor torque, blade position, battery current, blade pitch motor current, blade pitch rotation angle, blade pitch rotation time, or blade pitch rotation position as a function of time.

20. The wind turbine of claim 17, wherein the one or more processors are further operable to determine the condition of components comprising at least one of: controller, blade pitch module, batteries, blade pitch motor, accelerometer, blade pitch encoder, gear, shaft, or lubrication system.

* * * * *